United States Patent [19]
McKinney

[11] 3,888,694
[45] June 10, 1975

[54] APPARATUS AND METHOD FOR CLEANING AIR FILTER ELEMENTS BY VERTICAL RECIPROCATION

[76] Inventor: Lee R. McKinney, P.O. Box 1182, Kalispell, Mont. 59901

[22] Filed: Apr. 26, 1973

[21] Appl. No.: 354,739

[52] U.S. Cl. .................. 134/32; 134/164; 134/165
[51] Int. Cl. ......................... B08b 3/10; B08b 11/00
[58] Field of Search ....... 134/32, 23, 165, 164, 161, 134/160, 157, 155, 140, 141, 1; 210/391; 55/96, 304, 305

[56] References Cited
UNITED STATES PATENTS

| 2,194,607 | 3/1940 | McDevitt | 134/141 X |
| 2,408,248 | 9/1946 | Barber | 134/164 X |
| 2,724,392 | 11/1955 | Cooper | 134/165 X |
| 2,756,455 | 7/1956 | Slaughter, Jr. | 134/155 X |
| 2,824,029 | 2/1958 | Zinty | 134/23 |
| 2,973,289 | 2/1961 | Cropp et al. | 134/23 |
| 3,512,539 | 5/1970 | Hamilton | 134/155 X |
| 3,608,567 | 9/1971 | Neill, Jr. | 134/141 X |

*Primary Examiner*—S. Leon Bashore
*Assistant Examiner*—Richard V. Fisher
*Attorney, Agent, or Firm*—Dawson, Tilton, Fallon & Lungmus

[57] ABSTRACT

An apparatus and method for cleaning filtering elements of the type used in the air filters of heavy duty internal combustion engines. Each filter element is supported for axial and vertical reciprocatory movement in a chamber containing a suitable cleaning or rinsing solution. Total immersion of the open-bottomed element coupled with the manner of its reciprocation results in highly effective cleaning without damage to the relatively delicate material of the filtering element.

9 Claims, 4 Drawing Figures

APPARATUS AND METHOD FOR CLEANING AIR FILTER ELEMENTS BY VERTICAL RECIPROCATION

BACKGROUND

The filter elements used in heavy-duty large-scale equipment, such as the graders, trucks, and other units used in road construction and mining operations, are considerably larger and more costly than the air filters commonly used in passenger automobiles and other relatively small vehicles. Because such equipment is customarily exposed to conditions involving high levels of airborne particulate matter, frequent cleaning or replacement of the filter elements is required in order to prevent engine damage and maintain operating efficiency. The only alternative to complete replacement, namely, the cleaning and reinstallation of such elements, has not proved generally acceptable. Pressurized air, sometimes used to blow dust andd other particulate matter from a dirty filter element provides only a superficial cleaning. More important, a pressurized stream of air or other fluid may damage the fibrous matrix of the filter so that upon replacement the filter no longer effectively blocks the intake of particulate matter into the engine. As is well known, a damaged or ineffective filter may result in rapid engine wear and serious damage.

SUMMARY

One aspect of the present invention lies in the discovery that the folded or pleated paper filter elements commonly used in the filters of internal combustion engines may be totally immersed in a cleaning fluid, particularly an aqueous cleaning solution, and that when subjected to proper agitation in immersed condition such elements may be effectively cleaned without risk of damage to the filtering medium. In particular, it has been found that if such a filter element is totally immersed in a cleaning liquid with the axis of the element extending generally vertically and with the element's open end facing downwardly, such element may be effectively and thoroughly cleaned by subjecting it to short-stroke vertical reciprocatory movement at a frequency within the general range of 100 to 400 cycles per minute. The pleats or folds of such an annular element extend radially and axially; thus, during such agitation the liquid not only passes through the filter material but also surges along and between the folds to flush away the dislodged particulate matter. Since the filter element is completely immersed, localization of pressures or forces which might otherwise disrupt the integrity of the porous filter are avoided.

The stroke of the reciprocatory action should be no greater than a minor portion of the length of the filter element. Ordinarily such filters have a length ranging between 10 to 30 inches. In general, effective cleaning and rinsing may be achieved if a filter in that size range, reciprocated at the frequency described above, executes a stroke of approximately 0.5 to 4 inches, the preferred range being 1.5 to 2.5 inches.

The filter is supported with its open end facing downwardly upon an open mesh platform which is in turn carried by a pair of support arms. The upstanding support arms are reciprocably mounted upon a carriage and the entire carriage may be raised and lowered along a vertical frame to extract the filter from the body of cleaning liquid and to immerse the filter in that liquid. Means are provided for supporting the element (or elements) so that all movement except axial reciprocatory movement is prevented during cleaning and rinsing operations.

Other objects and advantages will appear from the specification and drawings.

DRAWINGS

DESCRIPTION

Figure 4:
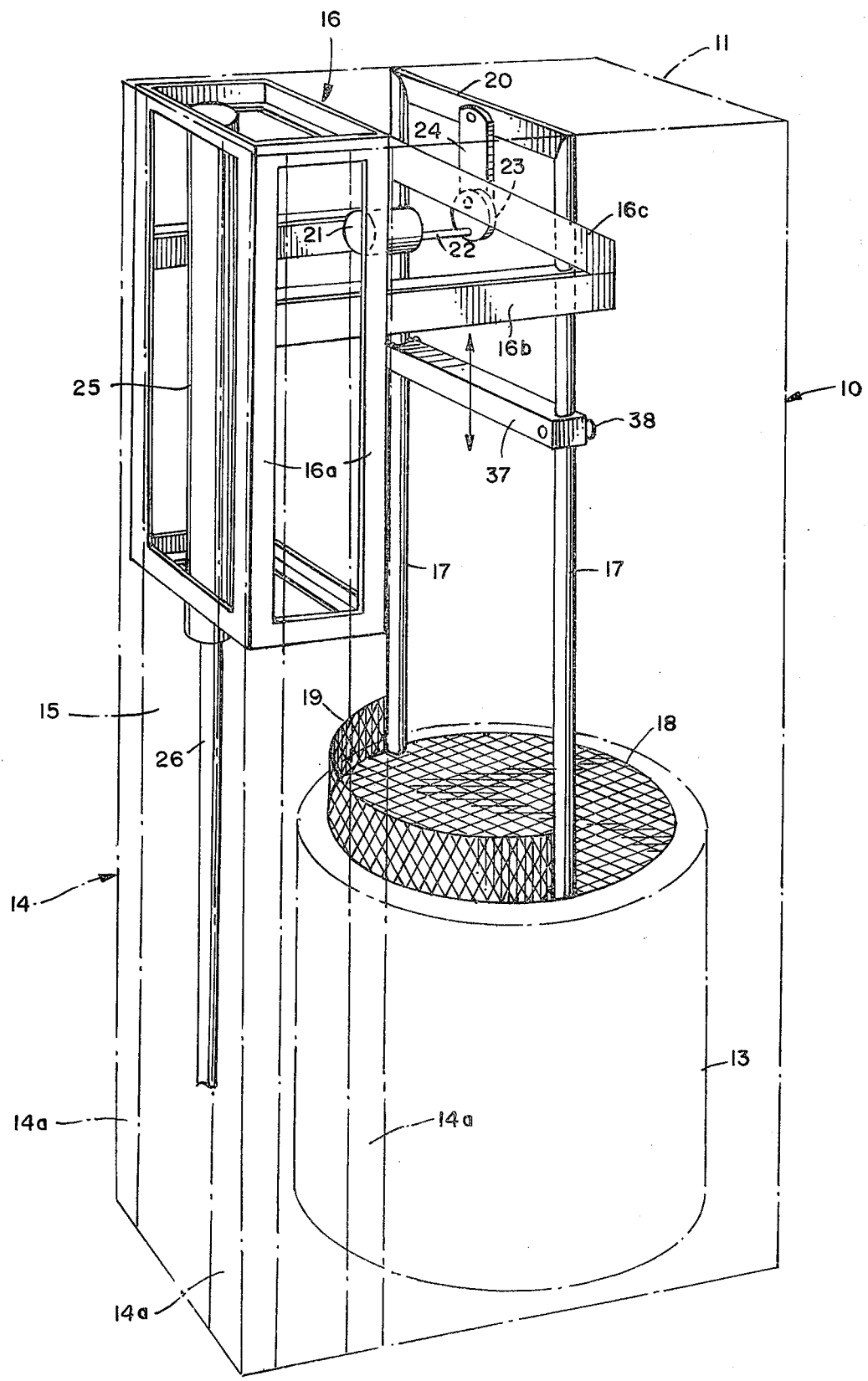
FIG. 4 is a perspective view showing partially in phantom and in somewhat simplified form, for clarity of illustration, the main structural features of the apparatus.

Referring to the drawings, the numeral 10 generally designates an apparatus comprising a vertically-elongated cabinet 11 which has front, side, and rear panels and which, in the illustration given, has a pair of front doors 12. The lower portion of the cabinet encloses a fluid reservoir or tub 13 as shown in phantom in FIG. 4. An upstanding frame 14 having a plurality of parallel upstanding frame members 14a is disposed at the rear 15 of the cabinet (FIG. 4). The vertical frame members 14a provide vertical tracks for guiding movement of a carriage assembly 16.

As shown most clearly in FIG. 4, the carriage assembly includes a framework of members 16a which are slidably retained by frame members 14a and which provide stable support for forwardly-projecting arms 16b. The arms may be braced by angular members 16c as shown in FIG. 4. A pair of vertical rods or bars 17 extend through arms 16b adjacent the free ends thereof and are longitudinally slidable within the openings of such arms. The lower ends of rods 17 are connected to a platform or basket 18 which, in the embodiment illustrated, is formed of expanded metal but which, if desired, may be formed of any other rigid porous material capable of allowing liquid to flow therethrough. The platform has a circular periphery somewhat smaller than the inside diameter of tube 13 and may, if desired, be provided with an upstanding protective rear screen 19.

Rods 17 are spaced apart a distance corresponding generally to the diameter of platform 18 and are joined at their upper ends by a horizontal cross bar 20. Reciprocation of the platform and its supporting means is achieved by a motor 21 mounted upon the platform with its shaft 22 operatively connected to cross bar 20 by means of eccentric 23 and link 24. Upon operation of the motor, rods 17 and platform 18 reciprocate vertically, the length of the stroke falling within the range of 0.5 to 4 inches. The rate of frequency of such reciprocation is within the range of 100 to 400 cycles per second. Particularly effective results have been achieved with a stroke of approximately 1.5 to 2.5 inches and a frequency of approximately 200 to 300 cycles per minute.

Figure 1:
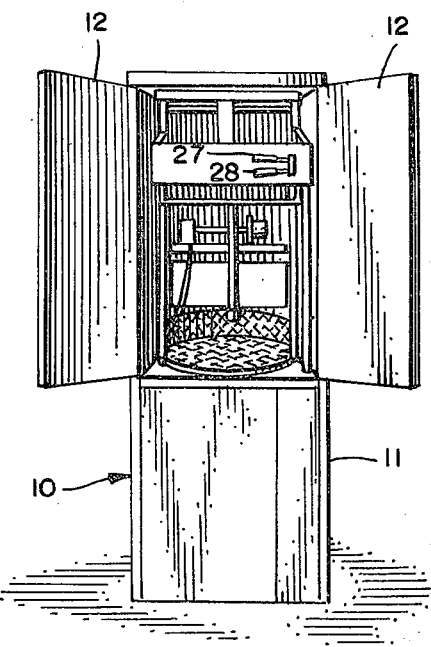
FIG. 1 is a front perspective view showing a filter cleaning apparatus with the front doors of the apparatus in open condition and with the carriage fully raised.
Figure 2:
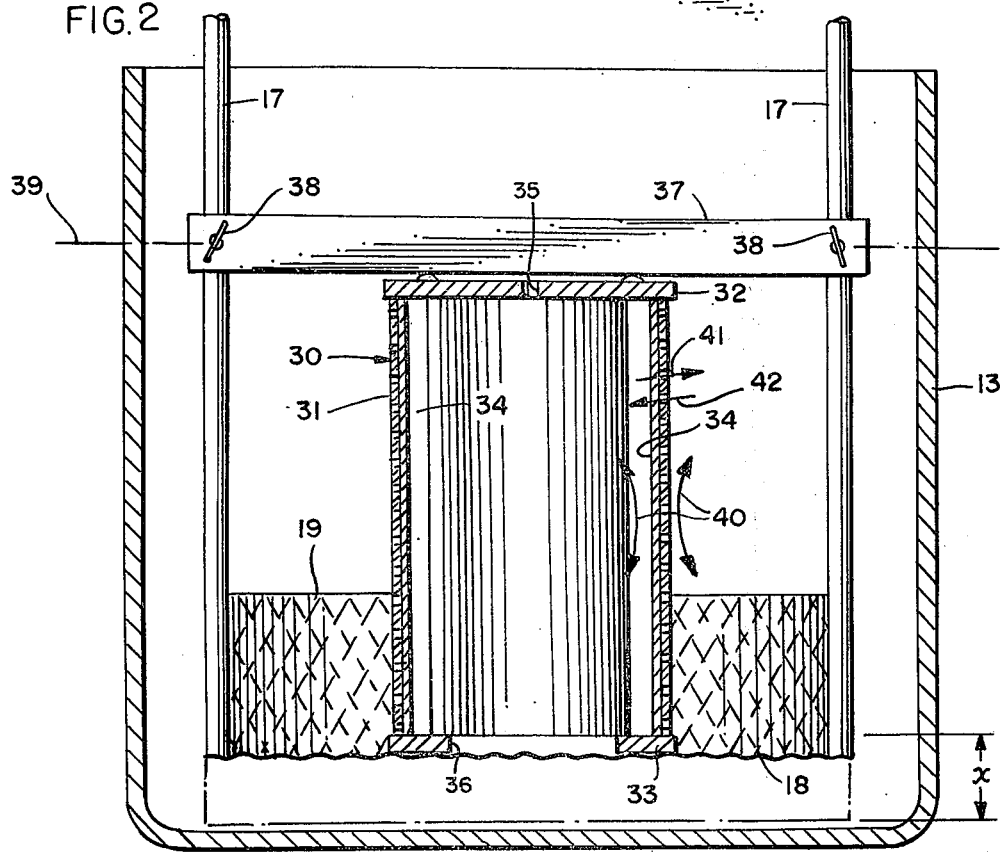
FIG. 2 is an enlarged vertical sectional view showing a filter element supported in lowered position within a tub or fluid reservoir.

The entire carriage is capable of being shifted along track members 14a between the fully raised position illustrated in FIGS. 1 and 4 and the lowered position shown in FIG. 2. While any suitable means may be utilized for selectively directing vertical movement of the carriage, the use of a double-acting hydraulic cylinder 25 and piston 26 is particularly advantageous. In FIG. 4, cylinder 25 is secured to carriage 16 and its piston rod 26 is suitably secured to frame 14. Controls 27 and 28 (FIG. 1) may be manipulated to raise and lower the carriage and to institute or discontinue reciprocation of platform assembly 18.

Figure 3:
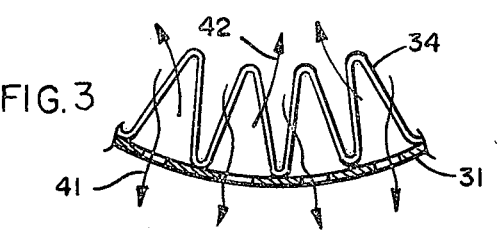
FIG. 3 is a still further enlarged fragmentary horizontal sectional view illustrating the direction of flow of liquid through the filter element during operation of the apparatus.

FIG. 2 illustrates a conventional air filter supported upon platform 18 with the open end of the cylindrical filter facing downwardly. The filter 30 consists essentially of a porous metal outer shell 31, end walls 32 and 33, and the porous filter material 34, ordinarily paper, in generally tubular and folded form within the outer shell. As shown in FIG. 3, the folds or pleats of the filter material extend vertically. In some cases, the filter is provided with a porous inner shell (not shown), the pleated or folded filter material 34 being disposed between the spaced inner and outer shells. End wall 32 is normally provided with a small opening 35 which may, if desired, be closed by a suitable cover plate (not shown) prior to operation of the apparatus. Since opening 35 is relatively small (in comparison to enlarged opening 36 at the other end of the filter element), it has generally been found unnecessary to seal off the upper opening. In other words, such opening is not sufficiently large to appreciably affect operation of the apparatus.

The filter element 30 is clamped upon platform 18 by a horizontal clamping member 37 which bridges bars 17 and which is slidably carried by those bars. Set screws 38, or any other suitable fastening means, may be used to secure clamping member 37 in place and thereby anchor filter 30 in the position shown.

The normal level of liquid within tub 13 is indicated by line 39 in FIG. 2. Thus, when the tub is filled and the carriage is fully lowered, filter element 30 is totally immersed in the washing solution. That solution is normally an aqueous solution of a suitable detergent which will not damage the porous filter. Any of a wide variety of known detergents may be used for that purpose.

In operation, a filter is placed with its open end facing downwardly upon raised platform 18 and is anchored in place by clamping member 37. Thereafter, the levers 27 and 28 are manipulated to lower the carriage and to commence vertical reciprocation of the platform and filter. Following a washing cycle of approximately 5 minutes, the tub is drained and refilled with clean water for a rinsing cycle of approximately 3 minutes duration. The tub is again drained and refilled for a second rinsing cycle of approximately 2 minutes duration. Automatic filling and draining of the tub is contemplated but since such operations are well known in standard automatic washers of various types, such features will not be described in detail herein.

The direction of movement of the filter element during the washing and rinsing cycles of the apparatus is believed to be of particular significance. Since the pleats or folds of the filter extend vertically, liquid sweeps along the folds in the directions indicated by arrows 40 in FIG. 2. In addition, liquid is forced radially through the pores of the filter, in the directions generally indicated by arrows 41. More specifically, as the filter travels downwardly during the descending stroke liquid disposed within the totally immersed filter unit cannot escape from the confines of the filter except by flowing outwardly in a generally radial direction. Particulate matter clinging to the outside of the filter is dislodged and flushed away by liquid which sweeps along the longitudinal folds of the filter. Thereafter, as the filter travels upwardly, water surges inwardly (see arrows 42) to dislodge particles clinging to the inside surfaces and such particles are similarly flushed away by liquid flowing in longitudinal directions. Since the filter element is totally immersed during the washing and rinsing cycles, there is no danger that localized pressure zones will develop that might rupture the integrity of the filter material and render the entire unit ineffective as a filtering element.

It is to be understood that while a filter element 30 of standard configuration has been shown and described, other conventional elements may assume different configurations and dimensions. For example, the length-diameter ratio may vary substantially. Also, while all such filters are generally cylindrical in shape, some have a slight taper. The term "generally cylindrical" is used herein to mean conventional filters of such configuration whether or not a slight taper is present.

While in the foregoing I have disclosed an embodiment of the invention in considerable detail for purposes of illustration, it will be understood by those skilled in the art that many of those details may be varied without departing from the spirit and scope of the invention.

I claim:

1. A method of cleaning a generally cylindrical air filter element having an enlarged opening at one end and being substantially closed at the opposite end thereof, said element also having an annular arrangement of longitudinally and radially extending folds of porous filter paper, comprising the steps of totally immersing said filter element in a body of cleaning liquid with the axis of said element extending generally vertically and with the enlarged end opening of said element facing downwardly and the sustantially closed opposite end facing upwardly, and thereafter axially reciprocating said element within said liquid at a frequency of approximately 100 to 400 cycles per minute and with a vertical stroke length within the range of 0.5 to 4 inches.

2. The method of claim 1 in which the length of said stroke is approximately 2 inches.

3. The method of claim 1 in which said frequency is approximately 200 to 300 cycles per minute.

4. The method of claim 1 in which there are the subsequent steps of draining said cleaning liquid and thereafter totally immersing said filter element in a rinsing liquid, and thereafter axially reciprocating said element within said rinsing liquid at a frequency of approximately 100 to 400 cycles per minute and with a vertical stroke length within the range of 0.5 to 4 inches.

5. An apparatus for cleaning generally cylindrical air filter elements, said elements each having an enlarged opening at one end and having an annular arrangement of longitudinally and radially extending folds of porous filter paper, wherein the apparatus comprises a frame, an open-topped reservoir adapted to contain a body of cleaning liquid, a carriage mounted for vertical movement relative to said frame, said carriage being provided with filter element clamping means for releasably clamping to the carriage at least one filter element with its axis extending generally vertically and with its enlarged opening facing downwardly, said carriage being movable between a lowered position for the total immersion of a supported filter element within said body of liquid and a raised position for complete withdrawal of a supported element from said body of liquid, means for selectively and vertically reciprocating said filter element supporting means at a frequency within the range of approximately 100 to 400 cycles per minute and with a vertical stroke length of approximately 0.5 to 4 inches when said carriage is in its lowered position, means maintaining said carriage in its lowered position during reciprocation, and means restraining said carriage against movement in all directions other than vertical during said reciprocation.

6. The apparatus of claim 5 in which said means for selectively and vertically reciprocating said filter element supporting means operates at a frequency within the range of approximately 200 to 300 cycles per minute.

7. The apparatus of claim 5 in which said stroke is approximately 2 inches.

8. The apparatus of claim 5 in which said filter element supporting means includes a generally horizontal porous platform adapted to be received within said open-topped reservoir and equipped with at least one upstanding bar reciprocably carried at its upper end by said carriage, said means for reciprocating said filter element supporting means comprising a motor operatively connected to said bar for driving said bar and platform in alternately opposite directions as said motor is operated.

9. The apparatus of claim 5 in which a pair of said bars is provided, said bars extending upwardly in parallel relation from opposite sides of said platform, said clamping means comprising a cross member slidably carried by said bars and equipped with locking means for anchoring said member to said bars at any selected position of adjustment.

* * * * *